United States Patent [19]
Cooper

[11] 3,828,759
[45] Aug. 13, 1974

[54] PORTABLE BARBECUE ASSEMBLY

[76] Inventor: George F. Cooper, 215 W. Fifth Ave., Flint, Mich. 48503

[22] Filed: Jan. 3, 1972

[21] Appl. No.: 214,692

[52] U.S. Cl. .............................. 126/9 R, 126/25 R
[51] Int. Cl. ........ F24c 1/16, F24b 3/00, A47j 37/07
[58] Field of Search...... 126/25 R, 9 R, 25 A, 30 R, 126/29

[56] References Cited
UNITED STATES PATENTS
2,122,275   6/1938   Bitney .............................. 126/25 R
3,404,671   10/1968  Wasserman ...................... 126/25 R Primary Examiner—Carroll B. Dority, Jr.
Assistant Examiner—Harold Joyce
Attorney, Agent, or Firm—Fisher, Krass, Young & Gerhardt

[57] ABSTRACT

A portable barbecue assembly wherein a frame is supported by frame supports that fold in alignment with the frame and also provide support for a fuel tray. The frame pivotally supports a grill which can be moved to an open position permitting access to the fuel tray. The grill has a plurality of prongs in which are positioned removable metallic sleeves. When folded, the unit can be stored in the fuel tray.

8 Claims, 3 Drawing Figures

PATENTED AUG 13 1974 3,828,759

PORTABLE BARBECUE ASSEMBLY

This invention relates to improvements in barbecues and particularly, although not exclusively, to barbecues of the portable type.

Commercially available barbecues present many problems to the user. One of these problems is grill cleaning. This is always a bothersome and difficult task because all sides of the grill rod structure are not conveniently accessible. In fact, special relatively expensive tools often must be used. Also the usual fuel receptacle presents problems in loading, adding and moving the fuel, particularly when the grill is hot. Another problem is portability. Most barbecues are bulky and cannot be fitted into the trunk of the average size automobile. Moreover, if the grill has been recently used, cooling often requires considerable time.

With the foregoing in mind, there is contemplated a new and different barbecue assembly that is portable, that is easily cleaned and that provides ready accessibility to the fuel bed.

Also contemplated is a barbecue assembly that is collapsible to facilitate portability.

Another objective is to provide a barbecue assembly wherein the grill can be manually moved from a grilling position to an open position so as to completely expose the fuel bed for convenient accessibility.

Still another objective is to provide a barbecue assembly wherein the grill can be easily kept clean. More specifically, a barbecue is contemplated that utilizes removable and disposable metallic sleeves for covering each grill prong or rod. Also contemplated is a barbecue that utilizes for covering each grill prong or rod reusable metallic sleeves which can be easily individually cleaned, for example, an automatic dishwasher.

Further contemplated is a barbecue that is uniquely constructed to permit compactness for storing.

Also contemplated is a barbecue that has limiting grill frame supports that are each provided with a portion for supporting a fuel tray which is allowed to move downwardly by merely manually flexing the frame supports so that the tray supporting portions disengage the tray.

The foregoing and other objects and advantages of the invention will become apparent from the following description and from the accompanying drawings in which.

Figure 2:
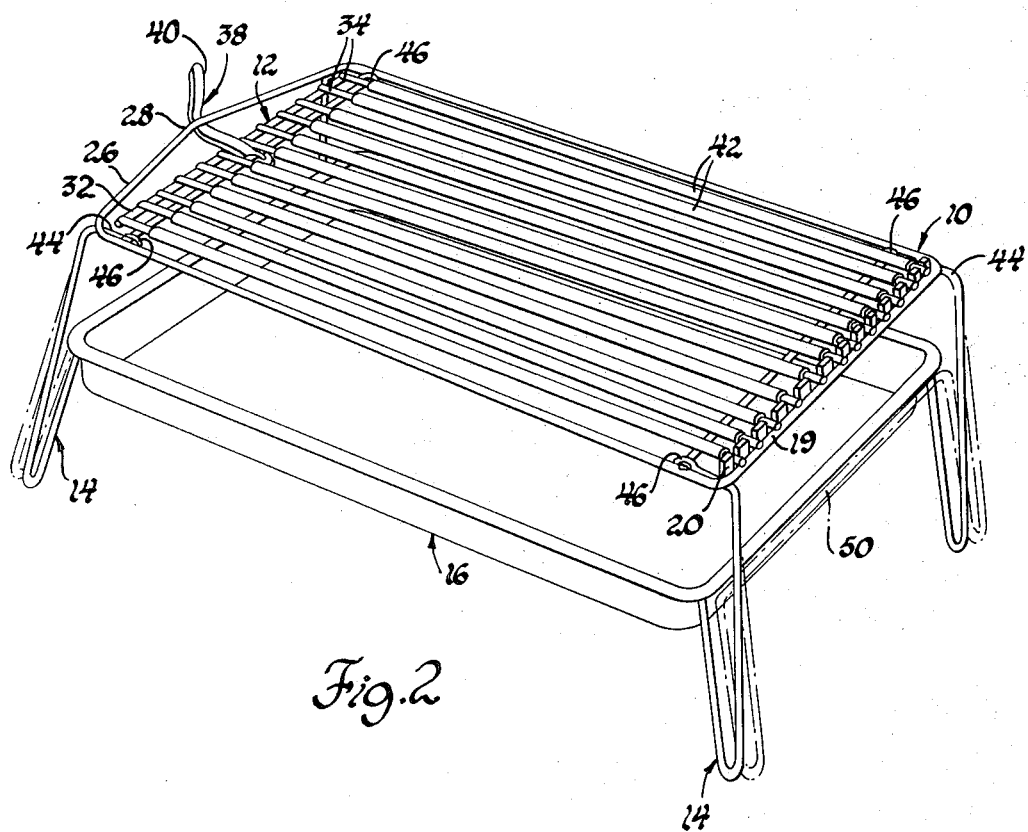
FIG. 2 is a perspective view of the barbecue assembly in the standing position.

Referring first to FIG. 2 the depicted barbecue assembly has a frame noted generally at 10. This frame 10 pivotally supports a grill designated generally by the numeral 12. The frame 10 also has pivotally joined to it at each end, frame supports 14. These frame supports 14 are so constructed that they maintain a fuel tray 18 in the illustrated position. The fuel tray 18 serves as a container for the usual barbecuing fuel; e.g., charcoal. In this embodiment the frame 10, the grill 12 and the frame supports 14 are made of metallic rod like material and where required, the various connections are by brazing, welding or the like. It should however be kept in mind that other fabrication methods can be used; for instance, stamping, casting, etc. and that unitary structures can be used.

Considering further the frame 10, as illustrated in FIG. 2, it is of a rectangular shape. At an end 19 there is provided an upright member 20 with a series of slots 22. Closely proximate this upright member 20 is a cross member 24. At the other end 26 the frame is bowed outwardly at 28 for clearance, if needed, and includes in opposing relation shaft supports 30.

The grill 12 on which the food to be barbecued is positioned has an end bar 32 from which laterally extends in parallel alignment a plurality of rods or prongs 34. Closely adjacent to the end bar 32 is a grill shaft 36. This grill shaft 36 is parallel with the end bar 32 and has its ends received within the shaft supports 30 at the opposite sides of the frame 10. The individual prongs 34 are each also appropriately secured to the grill shaft 36. This further facilitates the parallel alignment of the prongs 24. A handle 38 is secured both to the grill shaft 36 and the end bar 32 intermediate their ends and includes a stop end 40.

Figure 3:
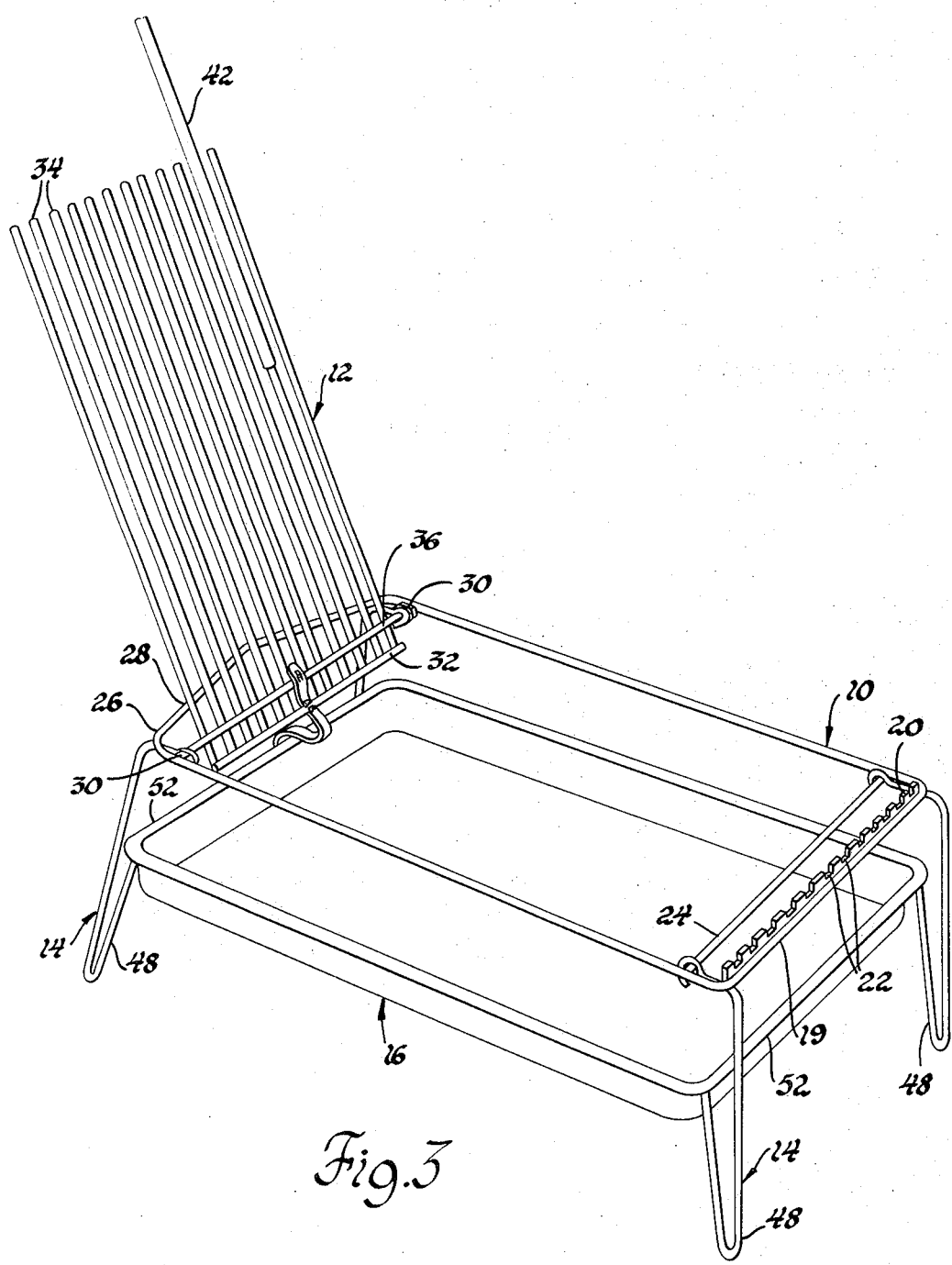
FIG. 3 is a perspective view of the barbecue assembly with the grill shown in the open position.

The grill 12 further includes a series of metallic sleeves 42 which slide over the prongs 34 as viewed in FIG. 3.

These metallic sleeves 42 can be formed of a thin aluminum material such as that used in trays for "TV dinners" and therefore, would be relatively inexpensive and could be discarded after each use of the barbecue assembly. Alternatively, if preferred, the metallic sleeves 42 could be made of a material that was more sturdy and after each use of the barbecue assembly, the sleeves 42 could be individually washed, for example, in an automatic dishwasher. Also it is contemplated that in some instances where the sleeves 42 were not available or it was desired not to use them, that the cooking could be done directly on the prongs 34. Because the prongs 34 are open at their ends and further because as will be explained, the grill can be pivoted to the FIG. 3 position; the prongs 34 can be individually cleaned on all sides. It is contemplated that the prongs 34 would be of a relatively flexible construction to facilitate this individual cleaning.

In operation, the grill 12 in the closed or grilling position shown in FIG. 2 has the ends of the prongs 34 engaging individual ones of the series of slots 22 in the upright member 20 on the frame 10. This maintains the alignment and also provides end support. When the grill 12 is to be removed to the open position depicted in FIG. 3, then the handle 38 is pushed so that the grill 12 rotates to the FIG. 3 position.

Figure 1:
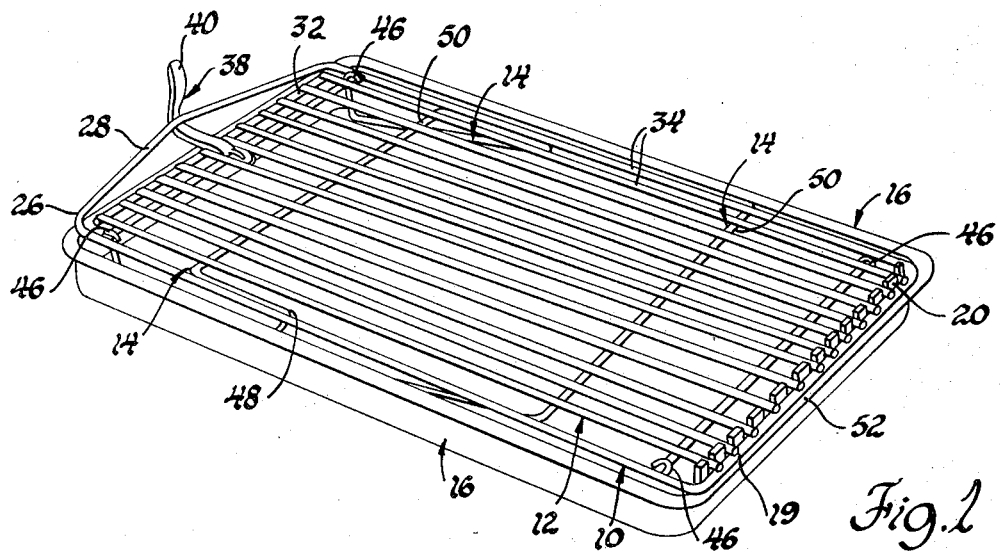
FIG. 1 is a perspective view of a folded barbecue assembly incorporating the principles of the invention.

The frame supports 14, as best shown in FIG. 2, each have frame supporting portions 44 that terminate in hook ends 46. These hook ends 46 surround the cross member 24 at the end 19 and the grill shaft at the end 26. The frame supporting portions 44 as seen in the FIG. 3 position support the frame 10. These hook ends 46 permit the frame supports 14 to be rotated inwardly so that they are substantial alignment with the frame 10 and provide a collapsed position as shown in FIG. 1. In addition the frame support 14 each have opposite leg portions 48 bent towards itself to form terminal ends and a tray supporting portion 50 extending above these terminal ends between these leg portions 48 as shown in FIGS. 2 and 3. The frame supports 14 are preferably formed of a flexible rod like metallic material for reasons to be mentioned.

Completing the barbecue assembly is a fuel tray 16 which has end flanges 52 that enable the fuel tray 16 to be positioned on the tray supporting portions 50 of the frame supports 14 as illustrated in FIG. 3. If preferred, these flanges 52 can extend around the entire edge of the fuel tray 16. The fuel tray 16 is formed of a noncombustible material which could be typically some kind of a thin sheet steel that can withstand the high temperatures involved during the cooking.

When the frame supports 14 are in the FIG. 1 folded or collapsed position and the grill 12 is also in its folded or grilling position, they can together be positioned as a unit within the tray 16 which correspondingly will have to be of a size depth to provide this compact assemblage and thus is easily stored and easily transported. To initiate use of the barbecue assembly, the fuel tray 16 is removed and the frame supports 14 pivoted outwardly to the FIG. 2 position. The fuel tray 16 is then positioned on the tray supporting portions 50 of the frame supports 14. During the loading of the fuel, the grill 12 can be pivoted to the FIG. 3 open position and the stop end 40 of the handle 38 will engage the adjacent flange 52 on the fuel tray 16 to provide a stop for maintaining the grill 12 in an over center position. Now the fuel tray 16 can be loaded with the fuel, or if the fuel is already in the fuel tray 16, it can be maneuvered to whatever location is desired and also additional fuel can be added. When cooking is to be commenced, the sleeves 42 either can be inserted into the prongs 34 or will have been previously inserted and the grill 12 moved to the FIG. 2 grilling position with the ends in engagement with the series of slots 22 in the upright member 20 on the frame 10.

Once the cooking has been completed, the flexible frame supports 14 can above the terminal ends be manually moved to their broken line position in FIG. 2 and the flanges 52 on the tray 16 will disengage the tray supporting portions 50. The grill 12 and the frame 12 can be turned upside down and the metallic sleeves 42 will each slide from the prongs 34 so that they can either be discarded or if they are not to be discarded, can be individually washed. The fuel tray 16 can be emptied and cooled and then used as mentioned and as shown in FIG. 1 to provide a carrier for the frame 10 grill 12 the folded frame supports 14 in the collapsed position.

Again it is mentioned that if the sleeves 42 are not available, cooking can be carried out on the prongs 34. Subsequently, because the grill 12 can be pivoted to the open FIG. 3 position and because the prongs are flexible, cleaning is very easy.

One should be mindful that the size of the barbecue assembly and the components can be varied substantially. Of course, if enlarged increased strength of the frame 10 and the frame supports 14 will be required. Also the grill 12 if heavy foods are to be cooked.

From the foregoing, it will be appreciated that the barbecue assemble is conveniently stored in a folded compact unit and later quickly readied for use. The grill 12 is easily cleaned and opens to allow access to the fuel tray 16 during use. After use, the assembly is quickly disassembled for storing.

What is claimed is:

1. In a portable barbecue assembly, the combination of a frame, a grill pivotally supported on one end of the frame and including a plurality of parallel grill prongs having the ends thereof engageable with and supportable by the other end of the frame, the grill being manually pivotable from a grilling closed position with the grill prongs thereof engaging the other end of the frame to a substantially upright opened position; a pair of frame supports each being of unitary flexible structure and also having a pivotal connection with an opposite end of the frame, each frame support also having a pair of leg portions each extending from a respective one of the pivotal connections and being bent towards itself to form a terminal end, each frame support also including a tray supporting portion extending between the terminal ends at the upper parts thereof; the pair of frame supports each being pivotal from a depending frame supporting position to a folded position in which the frame supports are substantially aligned with the frame; and a fuel tray having opposite end flanges each arranged to be positioned in engagement with a respective one of tray supporting portions of the frame supports when the frame supports are in the depending frame supporting position, the pair of leg portions each being manually bendable further towards itself above its terminal end to thereby move the tray supporting portions away from and out of engagement with the end flanges so as to allow the fuel tray to drop downwardly therefrom.

2. A portable barbecue assembly as described in claim 1, wherein the fuel tray is constructed to provide a receptacle for the frame, the grill and the frame supports when in the folded position.

3. A portable barbecue assembly as described in claim 2, wherein the frame has a plurality of slots along the other end for receiving respective ones of the grill rod ends.

4. A portable barbecue assembly as described in claim 1, wherein the frame has a plurality of slots along the other end for receiving a respective one of the grill rod ends in the grilling closed position of the grill; the grill includes a handle joined to the grill and manually operable to pivot the grill between the grilling closed and the open position and a plurality removable noncombustible sleeves one positioned on each grill prong.

5. A portable barbecue assembly as described in claim 4, wherein the handle includes a stop for engaging one of the tray flanges so as to maintain the grill in the open position and the fuel tray is constructed to provide a receptacle for storing the frame, the grill and the frame supports when in the folded position.

6. In a portable barbecue assembly, the combination of a rectangular shaped frame having at one end a fixed cross member and an upstanding member provided with a plurality of slots; a grill having an end member provided with a plurality of elongated prongs each extending laterally therefrom in substantial parallel alignment and terminating in prong ends, a grill shaft adjacent the end member and substantially parallel therewith, the grill shaft having the ends thereof rotatably mounted by the other end of the frame, and a handle joined to the grill and having a stop portion, the handle being manually maneuverable to pivot the grill from a grilling position with prong ends in engagement with a respective one of the slots to an over center open position in which the prong ends are disengaged from the slots; a pair of frame supports each being of unitary flexible structure and also having a pivotal connection with an opposite end of the frame, each frame support having two spaced apart leg portions each extending from a respective one of the pivotal connections and being bent towards itself to form a terminal end, each frame support also including a tray supporting portion extending between the terminal ends at the upper parts thereof, each leg portion having at the upper end thereof a frame supporting portion and a hook end portion, one of the frame supports having the hook end portions secured to the frame cross member and the other frame support having the hook end portions pivotally secured to the grill shaft, the pair of frame supports having a folded position in which the frame supports are pivoted so that the frame supports are substantially parallel with and in alignment with the frame and a standing position in which the frame supports extend downwardly from the frame and the frame supporting portions each engage the frame to provide support therefor; a removable fuel tray having end flanges arranged to be positioned in engagement with the tray supporting portions of the frame supports when the frame supports are in the standing position, the pair of leg supports each being capable of being manually bent further towards itself above its terminal end so as to move the tray supporting portions out of engagement with the tray end flanges and thereby allow the fuel tray to drop downwardly therefrom.

7. A portable barbecue assembly as described in claim 6, wherein the handle stop portion is constructed so as to engage one of the end flanges in the open position of the grill to limit further pivotal movement thereof and maintain the grill in the over center open position to allow free access to the fuel tray, and the grill further includes a plurality of removable noncombustible sleeves, one positioned on each grill prong.

8. A portable barbecue assembly as described in claim 6, wherein the grill includes a plurality of removable metallic sleeves, one positioned on each grill prong.

* * * * *